United States Patent [19]

McDaniel

[11] 4,381,353

[45] Apr. 26, 1983

[54] SPRAYED POLYURETHANE FOAMS EMPLOYING REACTIVE AMINES TO IMPROVE THE FOAM SURFACE

[75] Inventor: Kenneth G. McDaniel, Round Rock, Tex.

[73] Assignee: Texaco Inc., White Plains, N.Y.

[21] Appl. No.: 317,708

[22] Filed: Nov. 2, 1981

[51] Int. Cl.³ ............................................. C08G 18/14
[52] U.S. Cl. .................................. 521/131; 521/163; 521/164; 521/167
[58] Field of Search ................. 521/131, 163, 164, 167

[56] References Cited

U.S. PATENT DOCUMENTS

| | | | |
|---|---|---|---|
| 2,683,730 | 7/1954 | Seeger et al. | 521/163 |
| 2,950,263 | 8/1960 | Abbotson et al. | 521/163 |
| 3,012,008 | 12/1961 | Lister | 521/163 |
| 3,179,606 | 4/1965 | Prescott et al. | 521/163 |
| 3,297,597 | 1/1967 | Edwards et al. | 521/166 |
| 3,344,162 | 9/1967 | Rowton | 260/453 AR |
| 3,362,979 | 1/1968 | Bentley | 260/453 AR |
| 3,925,266 | 12/1975 | Fabris et al. | 521/164 |
| 3,984,360 | 10/1976 | Galbreath et al. | 521/163 |
| 4,076,654 | 2/1978 | Yukuta et al. | 521/164 |
| 4,218,543 | 8/1980 | Weber et al. | 521/51 |

*Primary Examiner*—Maurice J. Welsh
*Attorney, Agent, or Firm*—Jack H. Park; Kenneth R. Priem; David L. Mossman

[57] ABSTRACT

A polyurethane foam formulation for use primarily in sprayed applications has been discovered which provides a smoother than average foam surface. The formulation includes the addition of a primary or secondary mono or polyamine having a hydrogen functionality of two or greater. The compressive strengths of the resultant foams are equivalent to or greater than equivalent formulations without the amines, even though the amines also reduce fluorocarbon loss yielding lower density foams.

6 Claims, No Drawings

SPRAYED POLYURETHANE FOAMS EMPLOYING REACTIVE AMINES TO IMPROVE THE FOAM SURFACE

BACKGROUND OF THE INVENTION

1. Field of the Invention

The invention relates to polyurethane foams which are sprayed into place, and more particularly relates to the production of sprayed polyurethane foams which have smooth surfaces due to a mono or polyamine additive.

2. Description of Related Publications

Urethane foams are frequently used as building insulation, pipe and tank insulation, roof insulation, generally for any application where it is convenient that the insulation be sprayed into place. A foam having about a three pound density is commonly used for the roof applications. Two problems arise in the production of sprayed foams, the first being that the low viscosity foam components create problems during the spray operation since the continuous phases of the rising foams, which consist of the polyol and isocyanate, have lower viscosities and thus exhibit greater tendencies to flow during rise. The tendency to flow (lateral creep) can be decreased by the use of higher catalyst levels or by the use of more active catalysts. However, this solution creates the second problem; namely, the foam will have a rough surface since the over-spray will not blend with the rising foam.

Thus, a number of criteria are important in sprayed insulation foams, which are generally considered to be rigid foams. The foam must have a good compressive strength, usually greater than 40 psi, to withstand foot traffic without damaging the foam, and the foam should have a smooth surface since protective coatings are usually required and the smoother the surface, the less coating is required to cover the foam. It has been found that the use of small amounts of primary or secondary amines in the sprayed foam formulation will accomplish the result of a smooth surface without causing a decrease in the compressive strength.

It does not seem that those skilled in the art have applied themselves to trying to create a sprayed foam having a smooth outer surface when cured. However, a number of references disclose polyurethane foam formulations which generally have amine additives for one reason or another. Tertiary amines are, of course, common polyurethane catalysts. For example, U.S. Pat. No. 3,179,606 describes the use of compounds of the general formula NH$_2$(CH$_2$CH$_2$NH)$_x$(RO)$_n$R(NHCH$_2$CH$_2$)$_x$NH$_2$ where R is an alkene radical with 2 to 4 carbon atoms, x is an integer from 0 to 4, and n is an integer such that the polyglycol starting material used to prepare the polyamine has an average molecular weight of 400 to 2,000. This polyamine is used in the preparation of cellular polyurethane foam to rapidly attain high strength and to produce a foam having low density and a high elongation at its break point. U.S. Pat. No. 3,984,360 describes the use of polyoxyalkene primary amines of the type

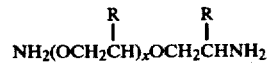

wherein x is an integer from 2 to 8, and R is hydrogen or lower alkyl. In this instance, the polyoxyalkene primary amines are used as the catalysts along with tin catalysts in the sprayed foams described therein to avoid the inclusion of lead salts. U.S. Pat. No. 4,218,543 and other patents cited therein describe the use of aryl amines in reaction injection molding systems.

A general review of the reaction of amines with isocyanates is given in "Polyurethane Chemistry and Technology, Part I," by J. H. Saunders and K. C. Frisch, Interscience Publishers (1962), pgs 65–72, 173–179. H. J. Kollmeier, et al. in "New Crosslinkers in the Development of High Resilience Polyurethane Foams," J. Cellular Plastics, (1977), pg 42, describe the use of diethanolamine to increase the stiffness of high resilience foams.

International Minerals and Chemical Corporation has recently marketed a polyurethane foam additive entitled "AMP" designed to promote a fast cream time and to serve as an HCl scavenger among other functions. Although AMP is promoted as being trifunctional with respect to the isocyanate reaction, AMP is known to be 2-amino-2-methyl-1-propanol which contains one hydroxyl group and one primary amine group for a total of two functionalities.

SUMMARY OF THE INVENTION

The invention is related to a polyurethane foam formulation suitable for application by spraying comprising a polyether or polyester polyol, an organic polyisocyanate, a halocarbon blowing agent, and an amine having one or more amine functionalities which are either primary or secondary amines and a total of two or more active hydrogen functionalities.

DETAILED DESCRIPTION OF THE PREFERRED EMBODIMENTS

Generally, the invention simply consists of employing an amine additive to give the surface of the foam a very smooth texture. Since smooth surfaces have less surface area than do rough surfaces, the smoother surface generated by the inventive formulation requires a smaller quantity of protective coating material.

The amine additive should have one or more primary and/or secondary amine groups and should have a total hydrogen functionality of 2 or more. It is preferred that the additives of this invention be alkanolamines, alkyl diamines, alkyl triamines, and higher functional amines and aryl amines.

To prepare polyurethanes according to the method of this invention, any aromatic polyisocyanate may be used. Typical aromatic polyisocyanates include m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl) methane, bis(3-methyl-4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Most preferred methylene-bridged polyphenyl polyisocyanate mixtures contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

The hydroxyl-containing polyol component which reacts with the isocyanate may suitably be a polyester polyol or a polyether polyol having a hydroxyl number ranging from about 700 to about 25, or lower. For sprayed rigid foams, the hydroxyl number is preferably in the range from 350 to 700. The functionality of the polyol component is preferably from about 3 to about 8.

When the polyol is a polyester, it is preferable to use as the polyester, a resin having a relatively high hydroxyl value and a relatively low acid value made from the reaction of a polycarboxylic acid with a polyhydric alcohol. Aromatic acids may be employed for the acid component. Aliphatic acids, such as succinic acid, adipic acid, sebacic acid, azelaic acid, etc. may also be employed and are preferred. The alcohol component for the polyester should preferably contain a plurality of hydroxyl groups and is preferably an aliphatic alcohol, such as ethylene glycol, glycerol, pentaerythritol, trimethylolethane, trimethylolpropane, mannitol, sorbitol, or methyl glucoside. Mixtures of two or more of the above identified alcohols may be employed also if desired.

For rigid polyether polyurethane foams, the polyol should have a functionality of from about 3 to about 8 and a molecular weight of from about 300 to about 1,200. Polyols for rigid polyether polyurethane foams may be made in various ways including the addition of an alkylene oxide as above to a polyhydric alcohol with a functionality of from 3 to 8. These polyols may also be, for example, Mannich condensation products of a phenol, an alkanolamine, and formaldehyde, which Mannich condensation product is then reacted with an alkylene oxide (see U.S. Pat. Nos. 3,297,597 and 4,137,265).

The amount of hydroxyl-containing polyol compound to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 0.9 to about 4.0 mole equivalents of isocyanate groups per mole equivalent of hydroxyl groups.

Maximum water content usually is approximately 0.3 weight percent of total formulation. Although higher contents could be used, the resulting foam would exhibit a poor K-factor.

It is within the scope of the present invention to utilize an extraneously added inert blowing agent such as a gas or gas-producing material. For example, halogenated low-boiling hydrocarbons, such as trichloromonofluoromethane and methylene chloride, etc. may be used. Selection of the proper blowing agent is well within the knowledge of those skilled in the art. See for example U.S. Pat. No. 3,072,082.

The additives discovered here which are useful in the preparation of sprayed polyurethane foams, based on the combined weight of the hydroxyl-containing compound and polyisocyanate are employed in an amount of from about 0.25 to about 10 weight percent. More often, the amount of additive used is preferred to be 1 to about 4 weight percent.

It may be expected that the additives of this invention may be used with one or more of the common urethane catalysts such as tertiary amines or organic tin compounds or other polyurethane catalysts or mixtures thereof.

The relative merits of foam surfaces were determined by taking a series of foam samples having surfaces ranging from essentially smooth and flat to rough and grainy and assigning a value of 1 to 5 to the samples based on their relative smoothness. A value of Class 1 was assigned to the foam surface which was smooth with no indentations or roughness and then higher values were assigned with relationship of the poorer the surface quality the larger the number assigned. These standards were then used in assigning a rating for the surface of a given foam.

The foam samples were sprayed using a Gusmer spray apparatus equipped with a Model FF proportional pump and an internal mix Model D spray gun with output of mixed component ranging from 7–10 pounds per minute.

The invention will be illustrated further with respect to the following specific examples, which are given by way of illustration and not as limitations on the scope of this invention.

EXAMPLE I

Three formulations were made and sprayed according to the techniques described above. The quantities are in units of parts by weight. Formulation A without an amine of this invention was made for purposes of comparison with Formulations B and C which contain amines. The formulation makeup is shown in Table I and the physical properties besides the surface ratings are presented in Table III. It should be noted that the heat from the additional amine reaction gives the added advantage of speeding the setting up of the foam to a total time of about 10 seconds.

TABLE I

| Formulation | A | B | C |
|---|---|---|---|
| THANOL ® R-650-X[1] | 18.1 | 16.0 | 16.0 |
| Polyol[2] | 11.5 | 10.2 | 10.2 |
| THANOL SF-265[3] | 5.0 | 4.42 | 4.42 |

TABLE I-continued

| Formulation | A | B | C |
|---|---|---|---|
| XNS 50054.2[4] | 3.0 | 3.0 | 3.0 |
| Trichlorofluoromethane | 11.2 | 11.3 | 11.3 |
| Diethanolamine | — | — | 4.0 |
| DIGLYCOLAMINE ® Agent[5] | — | 4.0 | — |
| THANOL F-3000[6] | 1.0 | 1.0 | 1.0 |
| POLYCAT ® 41[7] | 0.3 | — | — |
| FOMREZ ® UL-22[8] | 0.07 | 0.07 | 0.07 |
| FOMREZ UL-32[8] | 0.07 | 0.07 | 0.07 |
| MONDUR ® MR[9] Isocyanate | 50 parts by volume | | |
| Surface Rating | Class 3 | Class 2 | |

[1]A polyol made by Texaco Chemical Co. according to U.S. Pat. No. 4,137,265
[2]An experimental polyol based on sorbitol
[3]A polyol made by Texaco Chemical Co. having a hydroxyl number of 625
[4]An experimental fire retardant made by Dow Chemical Co.
[5]2-(2-aminoethoxy)ethanol made by Texaco Chemical Co.
[6]A polypropylene oxide polyol made by Texaco Chemical Co.
[7]A polyurethane catalyst made by Abbott Laboratories
[8]Polyurethane tin catalysts made by Witco Chemical Co.
[9]Product of Mobay Chemical Co.

EXAMPLE II

These formulations are slightly different from those of Example I in that they include a polyol based on methyl glucoside and have slightly different proportions. Again, Formulation D is used for comparative purposes while Formulations E and F contain the amine compounds of this invention. Again, physical properties other than the surface smoothness ratings are presented in Table III.

TABLE II

| Formulation | D | E | F |
|---|---|---|---|
| THANOL R-650 X | 18.1 | 16 | 17 |
| Experimental Polyol[1] | 11.5 | 10.2 | 10.2 |
| THANOL SF-265 | 5.0 | 4.42 | 4.42 |
| XNS 50054.2 | 3.0 | 3.0 | 3.0 |
| Trichlorofluoromethane | 11.3 | 11.3 | 11.3 |
| Diethanolamine | — | — | 3.0 |
| DIGLYCOLAMINE ® Agent | — | 4.0 | — |
| THANOL F-3000 | 1.0 | 1.0 | 1.0 |
| POLYCAT 41 | 0.3 | — | — |
| FOMREZ UL-22 | 0.07 | 0.07 | 0.07 |
| FOMREZ UL-32 | 0.07 | 0.07 | 0.07 |
| MONDUR MR Isocyanate | 50 parts by volume | | |
| Surface Rating | Class 2 | Class 1 | |

[1]Experimental polyol based on methyl glucoside

TABLE III

| Foam No. | | | A | B | D | E | F |
|---|---|---|---|---|---|---|---|
| | | | PHYSICAL PROPERTIES | | | | |
| Density, lb. per ft³ | | | 3.38 | 2.7 | 3.45 | 2.93 | 3.24 |
| K-factor, BTU, in/hr/ft³ | | | 0.138 | 0.132 | 0.146 | 0.132 | 0.133 |
| Compression strength, psi | | | 48.0 | 47.0 | 39.9 | 45.0 | 46.0 |
| Friability, % | | | 1.0 | 1.2 | 0.9 | 0.2 | — |
| Heat distortion, °C. | | | 193 | 184 | 181 | — | 179 |
| Closed cell, % | | | 94.8 | 96.6 | 95.4 | 96.4 | 96.0 |
| Dimensional stability, | | | Vol. Leng. | Vol. Leng. | Vol. Leng. | Vol. Leng. | Vol. Leng. |
| % change, 158° F. | | 1 wk | 3.7  1.5 | 1.2  0.7 | 4.0  1.7 | 3.7  1.8 | 4.7  1.8 |
| Relative humidity, | 100% | 4 wk | 4.9  2.0 | 3.0  1.8 | 6.1  2.3 | 7.8  3.7 | 8.4  3.0 |
| | 200° F. | 1 wk | 1.5  0.8 | 1.8  4.7 | 2.2  4.7 | 1.2  0.8 | 1.7  0.7 |
| | Dry | 4 wk | 4.7  2.7 | 3.5  1.7 | 1.0  2.3 | 3.7  1.8 | 4.0  2.3 |
| | −200° F. | 1 wk | −0.7  −0.5 | −1.0  −0.5 | −1.6  −1.2 | −0.3  −0.5 | −1.0  −0.5 |
| | Dry | 4 wk | −2.7  −0.5 | −0.5  −0.7 | −0.5  −0.7 | −0.3  −0.5 | −0.8  −0.5 |

It may be seen that in every instance, the foams having the amines of this invention in the formulation were smoother by one category than those without the amines. It may also be seen from Table III that the compressive strengths of the novel foams are equal to or greater than the strengths of foams made from similar formulations not having the amines. This last conclusion is surprising because the amines also reduce fluorocarbon loss which cause the foams to be less dense for a given concentration of fluorocarbon in the B-component. Less dense foams would be expected to have lower compressive strengths, which is not the case here.

I claim:

1. A rigid polyurethane foam formulation suitable for spray application comprising
    a. a polyether or polyester polyol,
    b. an organic polyisocyanate,
    c. a halocarbon blowing agent,
    d. a catalytic amount of a urethane catalyst and
    e. 1 to 4 weight percent of an alkanolamine surface-improving additive where the alkanolamine additive is diethanolamine.

2. A rigid polyurethane foam formulation suitable for spray application comprising
    a. a polyether or polyester polyol,
    b. an organic polyisocyanate,
    c. a halocarbon blowing agent,
    d. a catalytic amount of a urethane catalyst and
    e. 1 to 4 weight percent of an alkanolamine surface-improving additive where the alkanolamine additive is 2-(2-aminoethoxy)ethanol.

3. The rigid polyurethane foam formulation of claim 1 in which the polyol is prepared by reacting from 2 to 3 moles of propylene oxide with one mole of the Mannich reaction product of a mole of phenol or nonylphenol with one or two moles of formaldehyde and one or two moles of diethanolamine.

4. The rigid polyurethane foam formulation of claim 1 in which the halocarbon blowing agent is trichlorofluoromethane.

5. A cured rigid polyurethane foam having a smooth surface being produced by the process of spraying a polyurethane foam formulation comprising
    a. a polyether or polyester polyol,
    b. an organic polyisocyanate,
    c. a halocarbon blowing agent,
    d. a catalytic amount of a urethane catalyst and
    e. 1 to 4 weight percent of an alkanolamine surface-improving additive being selected from the group of alkanolamines consisting of 2-(2-aminoethoxy)ethanol and diethanolamine.

6. An improved method for producing a rigid polyurethane foam having a smooth surface comprising spraying a polyurethane foam formulation comprising
    a. a polyether or polyester polyol,
    b. an organic polyisocyanate,
    c. a halocarbon blowing agent,
    d. a catalytic amount of a urethane catalyst and
    e. the improvement comprising the inclusion of 1 to 4 weight percent of an alkanolamine surface-improving additive being selected from the group of alkanolamines consisting of 2-(2-aminoethoxy)ethanol and diethanolamine.

* * * * *